(12) United States Patent
Ramage et al.

(10) Patent No.: US 10,189,095 B2
(45) Date of Patent: Jan. 29, 2019

(54) DEVICE FOR DRILLING AN ACOUSTIC COMPONENT, CASSETTE, ACOUSTIC DRILLING METHOD AND METHOD OF MANUFACTURING AN ACOUSTIC COMPONENT

(71) Applicant: AIRCELLE, Gonfreville l'Orcher (FR)

(72) Inventors: Denis Ramage, Heuqueville (FR);
Didier Barbarit, Saint Georges de Montaigu (FR)

(73) Assignee: AIRCELLE, Gonfreville l'Orcher (FR)

( * ) Notice: Subject to any disclaimer, the term of this patent is extended or adjusted under 35 U.S.C. 154(b) by 573 days.

(21) Appl. No.: 14/817,244

(22) Filed: Aug. 4, 2015

(65) Prior Publication Data
US 2015/0336180 A1    Nov. 26, 2015

Related U.S. Application Data

(63) Continuation of application No. PCT/FR2014/050220, filed on Feb. 5, 2014.

(30) Foreign Application Priority Data

Feb. 6, 2013 (FR) ...................................... 13 51028

(51) Int. Cl.
*B23B 39/16* (2006.01)
*B23B 49/00* (2006.01)
(Continued)

(52) U.S. Cl.
CPC .......... *B23B 39/161* (2013.01); *B23B 49/003* (2013.01); *B32B 37/1284* (2013.01);
(Continued)

(58) Field of Classification Search
CPC . B23B 39/161; B23B 2270/48; B23B 49/003; Y10T 408/173; Y10T 408/38
See application file for complete search history.

(56) References Cited

U.S. PATENT DOCUMENTS

| | | | |
|---|---|---|---|
| 1,962,566 A | 6/1934 | Lovejoy | |
| 2,506,202 A * | 5/1950 | Folkerth, Sr. | ......... B23B 39/162 408/117 |

(Continued)

FOREIGN PATENT DOCUMENTS

| | | |
|---|---|---|
| DE | 102 59 285 A1 | 7/2004 |
| DE | 10 2004 009080 A1 | 9/2005 |

(Continued)

OTHER PUBLICATIONS

International Search Report dated May 16, 2014 in International Application No. PCT/FR2014/050220.

*Primary Examiner* — Eric A Gates
(74) *Attorney, Agent, or Firm* — Burris Law, PLLC (57) ABSTRACT

A device for drilling an acoustic component including a drilling head, and the drilling head has a support unit including at least two autonomous drilling cassettes. Each cassette includes at least one drill bit, a stationary frame with respect to the support unit, and a bit support moveable along the main axis (Δ) of the cassette between a retracted position and a deployed position. In particular, each bit support is equipped with a device for sensing the skin of the acoustic component to be drilled allowing to automatically control the drilling depth of the bits of each cassette.

17 Claims, 4 Drawing Sheets

(51) Int. Cl.
  *B32B 37/12* (2006.01)
  *G10K 11/172* (2006.01)
(52) U.S. Cl.
  CPC ....... *B23B 2215/04* (2013.01); *B23B 2270/16* (2013.01); *B23B 2270/48* (2013.01); *B32B 2305/024* (2013.01); *B32B 2313/04* (2013.01); *B32B 2405/00* (2013.01); *G10K 11/172* (2013.01); *Y10T 156/1031* (2015.01); *Y10T 408/03* (2015.01); *Y10T 408/173* (2015.01); *Y10T 408/65* (2015.01)

(56) References Cited

U.S. PATENT DOCUMENTS

| | | | | |
|---|---|---|---|---|
| 3,858,286 | A * | 1/1975 | Nohejl | B23B 39/161 408/53 |
| 3,973,859 | A * | 8/1976 | Huber | B23B 39/14 408/12 |
| 3,977,804 | A * | 8/1976 | Kitagawa | B23B 39/16 408/16 |
| 4,090,803 | A * | 5/1978 | Haley | B23B 39/165 408/103 |
| 4,162,134 | A * | 7/1979 | Kitagawa | B23B 39/16 408/42 |
| 4,198,181 | A * | 4/1980 | Smelser | B23B 39/161 408/16 |
| 4,397,074 | A * | 8/1983 | Thornton | B23B 39/161 29/564 |
| 4,419,803 | A * | 12/1983 | Thornton | B23B 39/161 29/428 |
| 4,441,245 | A * | 4/1984 | Thornton | B23B 39/161 29/564 |
| 4,493,595 | A * | 1/1985 | Klein | B23B 39/161 279/103 |
| 4,596,717 | A * | 6/1986 | Herbert | B27K 3/105 144/364 |
| 4,674,925 | A * | 6/1987 | Thornton | B23B 39/167 408/1 R |
| 4,759,513 | A | 7/1988 | Birbragher | |
| 4,813,822 | A * | 3/1989 | Biek | B23Q 16/001 408/137 |
| 4,847,979 | A * | 7/1989 | Reed | B23B 39/161 279/900 |
| 4,932,117 | A * | 6/1990 | Reed | B23B 35/005 408/68 |
| 4,984,352 | A * | 1/1991 | Reed | B23B 39/161 408/1 R |
| 5,147,160 | A | 9/1992 | Reed et al. | |
| 5,258,698 | A * | 11/1993 | Piovano | G05B 19/402 219/121.7 |
| 5,920,973 | A * | 7/1999 | Kosmowski | B23B 39/16 29/26 A |
| 6,412,156 | B1 * | 7/2002 | Yunokawa | B23B 39/161 29/50 |
| 6,438,446 | B1 * | 8/2002 | Trachier | G05B 19/416 408/11 |
| 6,527,686 | B1 * | 3/2003 | Houser | B23B 39/161 294/104 |
| 6,569,071 | B1 * | 5/2003 | Koren | B23B 39/162 408/42 |
| 6,824,334 | B2 * | 11/2004 | Reguzzi | B23B 39/161 408/42 |
| 6,854,168 | B2 * | 2/2005 | Booms | B26F 1/003 29/26 A |
| 7,065,856 | B1 * | 6/2006 | Lemelson | B23Q 41/06 29/563 |
| 7,313,850 | B2 * | 1/2008 | Miller | B23B 3/065 29/27 C |
| 2012/0189394 | A1 * | 7/2012 | Meier | B23B 39/161 408/130 |

FOREIGN PATENT DOCUMENTS

| | | | |
|---|---|---|---|
| EP | 1 101 555 A2 | 5/2001 | |
| EP | 2 178 684 B1 | 10/2012 | |
| FR | 2 703 280 A1 | 10/1994 | |
| RU | 2064691 C1 * | 7/1996 | |
| WO | WO 2013161330 A1 * | 10/2013 | ............ B23Q 7/047 |

* cited by examiner

DEVICE FOR DRILLING AN ACOUSTIC COMPONENT, CASSETTE, ACOUSTIC DRILLING METHOD AND METHOD OF MANUFACTURING AN ACOUSTIC COMPONENT

CROSS-REFERENCE TO RELATED APPLICATIONS

This application is a continuation of International Application No. PCT/FR2014/050220, filed on Feb. 5, 2014, which claims the benefit of FR 13/51028, filed on Feb. 6, 2013. The disclosures of the above applications are incorporated herein by reference.

FIELD

The present disclosure relates to the field of drilling acoustic components in aeronautics in particular but not exclusively drilling composite components, and more particularly relates to an auto-adaptive device for drilling acoustic components.

BACKGROUND

The statements in this section merely provide background information related to the present disclosure and may not constitute prior art.

In the field of drilling acoustic components, robots with arms, or 5-axis machines, are used for carrying heads integrating bits disposed in a line or in a matrix manner. These heads are fixed on the arms of the robots or the 5-axis machines and each robot or 5-axis machine is programmed to place a head above an area of an acoustic component to be drilled, so that the bits integrated in the head may drill the area. Then, this head is displaced above the acoustic component according to a computed trajectory in order to adjust the time and improve quality of drilling the acoustic components so as to join another area to the acoustic component to be drilled of and carry out another drilling thereto.

Currently, the acoustic heads for drilling are achieved by disposing bits in a matrix manner, for example 9 bits distributed into three rows of three columns (3*3) or even 21 bits distributed in 7 lines and three columns (7*3). In this type of device, the drilling ends of the bits are disposed in a same stationary plane with respect to the acoustic head for drilling.

The matrix drilling is more efficient than line drilling but nevertheless has drawbacks, in particular the difficulties to align the ends of the bits in a parallel fashion with a non-planar skin and additional difficulties of managing the depth of each hole, or even the necessity of modifying the drilling head in order to manage reduced inter-patch spaces or according to the entry angle of the drilling head, or even the relatively low drilling pace.

Inter-patch means the non-drilled distance left between two adjoining patches (two drillings).

The difficulties of aligning the ends of the bits in a parallel fashion with a non-planar skin of an acoustic component to be drilled sometimes requires breaking the bits so that they do not penetrate too much into the acoustic component to be drilled thus risking drilling the acoustic component right through, this breaking operation makes operators lose a significant amount of time, and in addition is expensive since new bits must replace the broken bits once these are no longer used.

Moreover, the maintenance of such heads for drilling acoustic components is difficult in particular as currently specialized production operators handle these drilling heads, but should a problem arise, the operator must call a specialized maintenance team, which is moreover expensive and slows down production.

SUMMARY

The present disclosure provides a drilling device comprising a drilling head, characterized in that the drilling head comprises a support unit of at least two autonomous drilling cassettes each comprising at least one drill bit.

Autonomous cassettes mean cassettes mounted independently from each other on the support unit, and more generally each constituting an autonomous drilling unit in its own right once set up on the support unit.

This configuration has several advantages in particular in that, due to the fact that the cassettes are autonomous units, each cassette may be adjusted independently from the others. The device hence has greater flexibility than a standard matrix type drilling device.

According to one feature of the present disclosure, each cassette comprises a stationary frame with respect to the support unit and a bit support moveable along the main axis of the cassette between a retracted position and a deployed position.

Advantageously, such a disposition allows adjusting the height of each cassette with respect to the surface to be drilled, and thus independently from each other. Indeed, the fact that the bit support is moveable along the main axis of the cassette allows it to translate.

According to another feature of the present disclosure, each cassette comprises a means for moving the bit support in translation by means of a mechanism mounted on the stationary frame thereof and on the bit support.

According to one form of the present disclosure, the mechanism for moving in translation is a ball screw, the ball screw being mounted on the stationary frame of the cassette.

The ball screw is hence put in a rotational movement via a transmission mechanism connecting an electric motor mounted for example on the stationary frame to the ball screw in particular of belt or chain type.

According to another form of the present disclosure, the means for moving in translation allows adjusting in intermediate position the bit support between its retracted position and its deployed position.

According to another form of the present disclosure, the adjustment in intermediate position of each bit support is carried out continuously.

In this manner, it is possible to make a precise adjustment of the height of the bit support of each cassette with respect to the surface to be drilled.

According to another feature of the present disclosure, the adjustment in intermediate position of each bit support is carried out discreetly.

Advantageously, adjusting the height of the bit supports of each cassette independently from each other allows adapting the arrangement profile of the bits with respect to each other in such a manner as to correspond to the shape of the surface to be drilled.

According to other feature of the present disclosure, each cassette is removeably fixed on the support unit.

Advantageously, in case of failure of a cassette among the set of cassettes used for carrying out a drilling, only this defective cassette needs to be removed and replaced instead of what is currently done where the drilling head must be treated in its entirety.

According to one form of the present disclosure, the cassettes are fixed on the support unit by means of screws or clipping means.

According to another form of the present disclosure, each cassette includes two bits.

According to another form of the present disclosure, the cassettes are disposed in line in a substantially adjoining manner on the support unit.

According to other form of the present disclosure, the drilling device comprises eleven cassettes disposed in line, each comprising two bits disposed on either side of the axis of the line thus formed.

In still other form of the present disclosure, each cassette comprises a mechanism of inertial dynamic balancing.

Inertial dynamic balancing means the compensation of the forces generated by the movement of the bit support in such a manner as to reduce or even cancel the vibrations generated by this movement which may cause imprecisions during the drilling operation.

The inertial dynamic balancing mechanism may for example comprises a counterweight in sliding connection with the stationary frame of the cassette performing opposite movements to the movements of the bit support.

According to one form of the present disclosure, each cassette is equipped with a brushless motor.

The brushless motor serves in particular for managing the position of the bit support with respect to the stationary frame.

Advantageously, a brushless motor is a motor allowing to obtain a high efficiency and a high output power.

According to another feature of the present disclosure, each bit support is equipped with at least one device for sensing the skin of the acoustic component to be drilled.

This sensing device comprises at least one sensor and at least one detector to detect by means of sensors the position of the bits with respect to the skin of the acoustic component to be drilled. The sensing device also allows pressing the acoustic component to be drilled on the support during the drilling operations.

In another form of the present disclosure, the dimensioning of the motor is adapted to the increase of inertia linked to the inertial dynamic balancing mechanism.

According to another feature of the present disclosure, the sensing device allows adjusting the position of the bit support with respect to the skin of the component to be drilled allowing to automatically control the drilling depth of the bits of each cassette.

The present disclosure also relates to a cassette capable of cooperating with a device according to any one of the preceding claims comprising:
 a brushless motor,
 a bit support,
 means for moving in translation the bit support,
 an inertial dynamic balancing mechanism,
 at least one bit,
 a sensing device.

The present disclosure also relates to a method of acoustic drilling characterized in that it implements a device for drilling acoustic components comprising a drilling head, the drilling head comprising a support unit comprising at least two autonomous drilling cassettes, each comprising at least one drill bit.

The present disclosure finally relates to a method for producing an acoustic component comprising an acoustic skin and a honeycomb structure, the method comprising the following steps:
 drape forming the acoustic skin with a carbon layer in the form of fabric;
 drape forming a double-sided adhesive layer made of polymer for allowing the subsequent adhesion of the acoustic skin on a honeycomb structure;
 adding the honeycomb structure on the acoustic skin;
 single curing, in order to polymerize the carbon layers and the double-sided adhesive of the acoustic skin, and finishing the assembling of the acoustic skin on the honeycomb structure;
 drilling the acoustic skin with an acoustic drilling device according to the present disclosure, thus allowing to control the diameter of the acoustic holes drilled and thereby the acoustic performance of the final acoustic component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
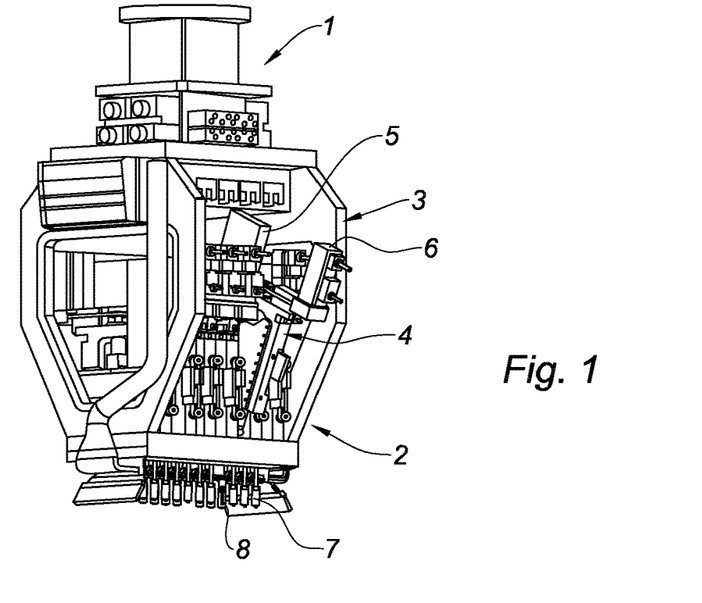
FIG. 1 is a perspective view of a drilling device according to one form of the present disclosure.

With reference to FIG. 1, a drilling device 1 comprising a drilling head 2 is illustrated, and the drilling head 2 comprises a support unit 3 of a plurality of cassettes 4. The cassettes 4 are removably mounted on the support unit 3.

As illustrated in FIG. 1, a cassette 4 is represented, in dismantling or mounting phase on the support unit 3, on which is visible a counterweight 5 intended for an inertial dynamic balancing. A counterweight 5 equips each cassette 4 of the drilling device 1.

Figure 7:
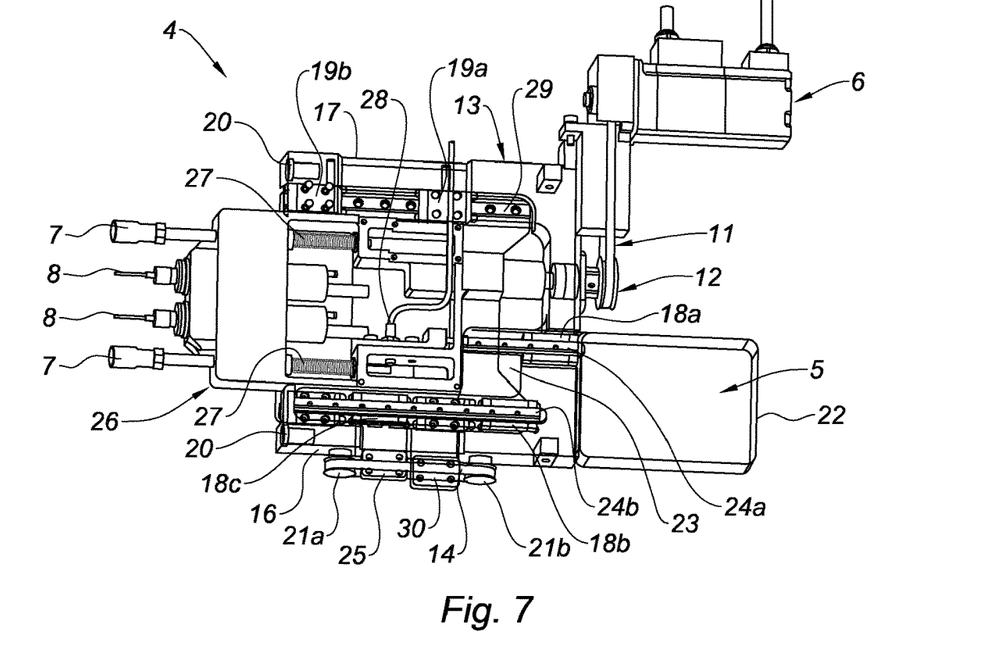
FIG. 7 is a perspective view of the cassette without protective caps according to one form of the present disclosure.

Each cassette 4 is equipped with a brushless motor 6, with two sensors 7, and two bits 8 (see also FIG. 7). The two sensors 7 are located on either side of the two bits 8 in such a manner that the sensors 7 and the bits 8 be located substantially on a same axis.

Figure 2:
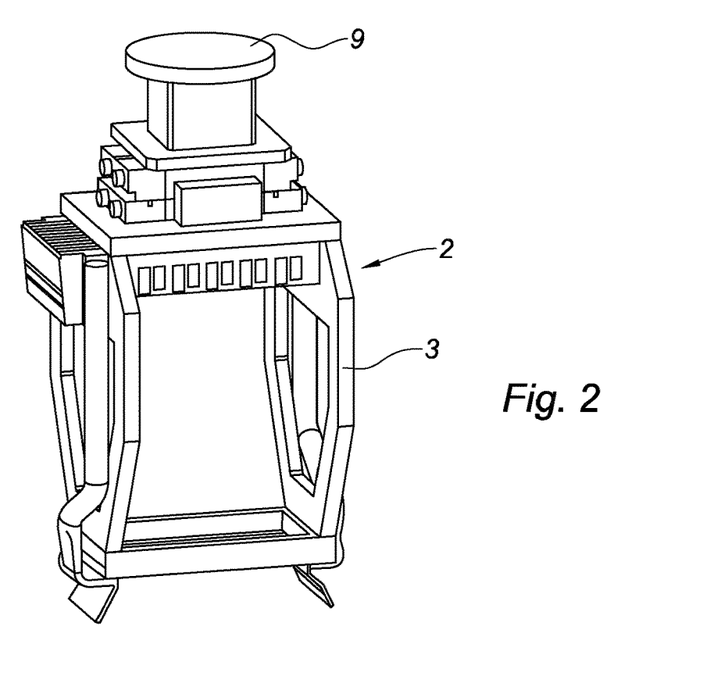
FIG. 2 is a perspective view of a support unit according to one form of the present disclosure.

With reference to FIG. 2, the support unit 3 comprises a fixing interface 9 intended to allow mounting the drilling head 2 on the arm of the manipulator-type robot (not represented).

The support unit 3 also comprises a module 10 for driving the brushless motors 6.

Figure 3:
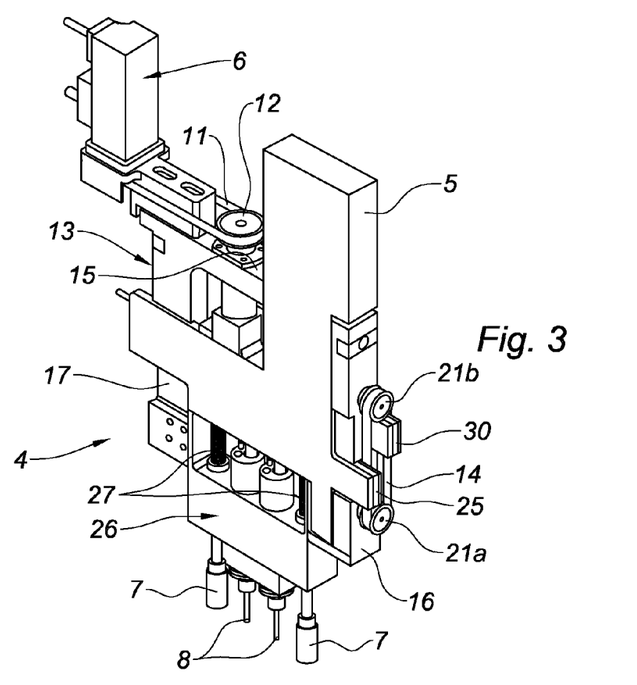
FIG. 3 is a perspective view of a cassette according to one form of the present disclosure.

With reference to FIG. 3, a cassette 4 equipping the drilling device 1 is described.

The brushless motor 6 is connected to a first flat belt 11 itself cooperating with a ball screw 12. Thus, the brushless motor 6 actuates the ball screw 12 by means of the first flat belt 11.

The ball screw 12 serves as a mechanical actuator, and it acts as a jack.

The ball screw 12 is fixed on a stationary frame 13 of the cassette 4 substantially in a U shape in such a manner that the head of the ball screw 12 in contact with the first flat belt 11 be substantially flush with the outer skin of the base of the stationary U shaped frame 13.

The counterweight 5, a second flat belt 14, the two sensors 7 and the two bits 8 are also represented.

Figure 4:
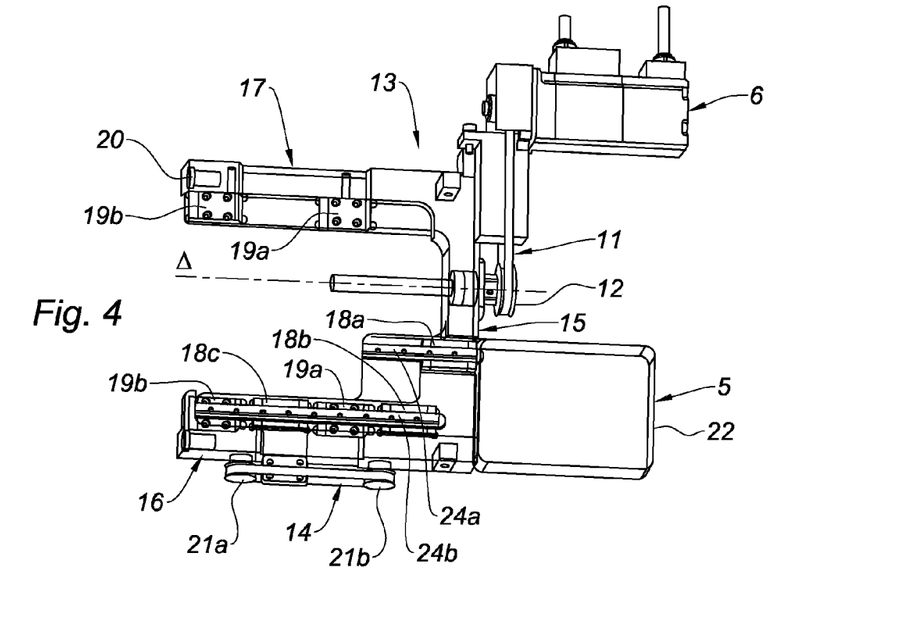
FIG. 4 is a perspective view of a stationary frame according to one form of the present disclosure.

With reference to FIG. 4, the stationary frame 13 of the cassette 4 is described in detail.

The stationary frame 13 has a substantially U shape, with a base 15 and two branches 16 and 17. The brushless motor 6 and the counterweight 5 are each connected to one end of the base 15.

The base 15 and the branch 16 respectively comprise a pad 18a and two pads 18b, 18c for guiding the counterweight 5 in translation. The guiding thus obtained allows the counterweight 5 to translate substantially parallel to the branches 16 and 17.

The branch 16 also comprises the second flat belt 14 on which the counterweight 5 is attached.

Each of the branches 16 and 17 comprises two guiding pads 19a and 19b in translation. The pads 19a, 19b of the branch 17 are symmetrical to the pads 19a, 19b of the branch 16 with respect to the main axis Δ of the stationary frame 13.

A tapped hole 20 is made at the end of each of the branches 16 and 17 in such a manner that a screw may penetrate into each of the holes 20 along the main axis of each of the branches 16 and 17.

The ball screw crosses the base 15 of the stationary frame 13 and the main axis thereof is substantially coincident with that Δ of the stationary frame 13. The threading of the ball screw extends over a length of around 35 mm.

The second flat belt 14 is disposed along the branch 16 and extends between two pulleys 21a and 21b, the pulleys 21a and 21b being disposed in such a manner that the shortest distance separating them has a value higher than or equal to 35 mm.

It is worth noting that the referenced belts 11 and 14 are preferentially flat but may also be notched, trapezoidal or any other type of belt. Likewise, the belts 11 and 14 may be chains.

The advantage of flat belts is that they are noiseless, can be used at high speeds, and that they absorb torsional vibrations and have a very good efficiency, in comparison with that of gears.

The head of the ball screw 12 flush with the outer skin of the base 15 of the stationary frame 13 serves as pulley for the first flat belt 11.

Advantageously, the balls of the ball screw 12 interposed between the screw and the housing thereof may allow to notably decrease or even remove the friction which occurs during the movement of the ball screw 12.

Generally, the advantage of ball screws is that they have a high efficiency, allow high precision adjustments with high displacement speeds and that they hardly become overheated.

Figure 5:
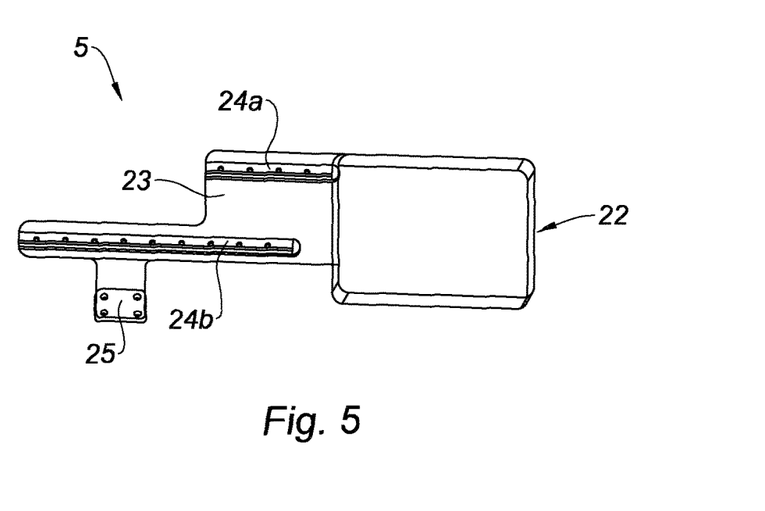
FIG. 5 is a perspective view of a counterweight according to one form of the present disclosure.

In reference to FIG. 5, the counterweight 5 is described in further detail.

The counterweight 5 comprises an inertial mass 22 and a metal tab 23. The metal tab 23 comprises two rails 24a and 24b arranged and fashioned in such a manner that the rail 24a cooperates with the pad 18a (FIG. 4) and in that the rail 24b cooperates with the pads 18b and 18c. The counterweight 5 also comprises a connecting flange 25 for connecting the counterweight 5 and the second flat belt 14. The connecting flange "bites" the second flat belt 14 on a strand of the latter comprised between the two pulleys.

Figure 6:
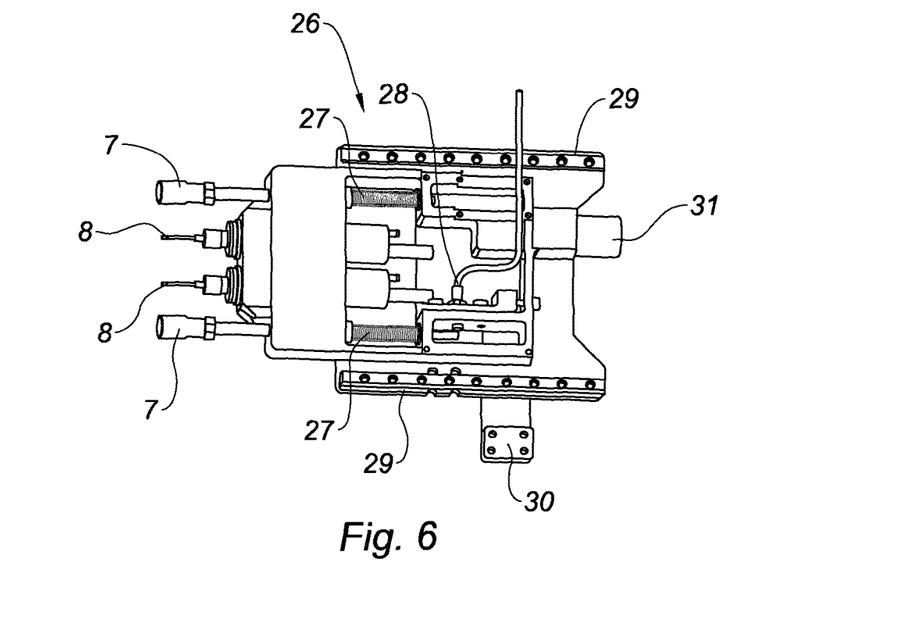
FIG. 6 is a perspective view of a moveable bit support according to one form of the present disclosure.

With reference to FIG. 6, a bit support 26 is illustrated and comprises the sensors 7 each mounted on a spring 27, the bits 8, an electric detector 28, lateral rails 29, a connecting flange 30, and a housing 31 for the ball screw 12 (FIG. 4).

When a pressure is exerted on the end of the sensors 7 intended for sensing, the sensors 7 retract inside the bit support 26 as a result of this pressure. The springs 27 are mounted on the sensors 7 in such a manner that when the pressure eases, the sensors take up their initial position again.

The electric sensor 28 is set up in the bit support 26 in such a manner that it may detect the entry in its detection field of the distal end at the sensing end of one of the sensors 7, the electric detector 28 hence allows automatically knowing when this sensor 7 has come in contact with the surface of the component to be drilled.

The lateral rails 29 are intended to cooperate with the pads 19a and 19b for guiding in translation.

The connecting flange 30 is intended to connect the bit support 26 and the second flat belt 14 in such a manner that the connecting flange 30 "bites" the second flat belt 14 on the strand of the belt which has not been "bitten" by the connecting flange 25 of the counterweight 5 (FIGS. 4 and 5).

The housing 31 is the housing of the ball screw 12 in the bit support 26.

The electric hysteresis of the detection must be as short as possible consequently, a specific detector for example of laser detector type may be used instead of the electric detector 28, however, the distal end at the sensing end of the sensor 7 which should be detected may also be made of soft iron or covered with a layer of soft iron.

In order to facilitate the adjusting, the detector is mounted on an adjustable pad with a screw with fine thread and maintained in position after adjustment.

A possible failure of this detector may be overcome by an automatism providing a redundancy in the vicinity, that is to say in the event the distal end is not detected at the sensing end of the sensor 7, the detector will be considered deficient, and the automatism will hence control the fact that the bits of the deficient cassette advance at the same speed as the bits of the cassettes in the immediate vicinity via the detectors of the cassettes in the immediate vicinity. This advantage prevents that each cassette be equipped with two detectors of which one is taken in consideration in case the other becomes defective.

Such a sensing device allows automatically controlling the drilling depth of the bits of each cassette. Thus, there where the prior art allowed a drilling of acoustic skins only prior to their assembly with honeycomb structures, such a control has the advantage of allowing if need be the drilling of the acoustic skins after assembly of the acoustic skins with honeycomb structures without notable damage to the honeycomb structures and without the drill bits drilling the final acoustic components right through if need be.

Drilling the acoustic skins after their assembly on honeycomb structures has several advantages, in particular that according to which the prior acoustic drilling technique(s) required, during producing an acoustic component, drape forming the acoustic skin with a carbon layer in the form of fabric, polymerizing the carbon layer by a first curing, drilling the acoustic skin, coating with a double-sided adhesive made of polymer in order to allow the subsequent adhesion of the acoustic skin on a honeycomb structure, then cross-linking by heating the double-sided adhesive in order to reopen the acoustic holes, thus leading to uncertainty about the value of the diameter of the acoustic holes, the double-sided polymerization adhesive being introduced into the acoustic holes by cross linkage, and a significant degradation of acoustic performances of the acoustic component, adding the honeycomb structure on the acoustic skin, the second curing for finishing the assembling of the acoustic panel, a step during which the double-sided adhesive is entirely polymerized, the present disclosure allows simplifying this method, reducing the implementation cost and improving the control of the acoustic performance of the final acoustic component, simply consisting in:

drape forming the acoustic skin with a layer of carbon in the form of a fabric, drape-forming a double-sided adhesive layer of polymer for allowing the subsequent adhesion of the acoustic skin on a honeycomb structure, adding the honeycomb structure onto the acoustic skin, a single curing, for polymerizing the carbon layers and the double-sided adhesive of the acoustic skin, and finishing the assembly of the acoustic skin on the honeycomb structure, drilling the acoustic skin with an acoustic drilling device according to the present disclosure, thus allowing to control the diameter of the acoustic holes thus drilled and thereby the acoustic performance of the final acoustic component.

It is of course possible to use an acoustic drilling device according to the present disclosure in order to implement a technique for producing an acoustic component according to a prior method.

In reference to FIG. 7, the general operating of the cassette 4 is described.

When the brushless motor is actuated, it drives the first flat belt 11 in its travel. The first flat belt 11 is connected to the head of the ball screw 12 serving as pulley, and the ball screw 12 is hence driven in rotation. When it turns, the ball screw does not make a translation movement with respect to the stationary frame 13. The ball screw 12 is in pivot connection with the stationary frame 13. In the rotation movement, the ball screw 12 drives the bit support 26 thanks to the housing 31 comprising a ball nut. The bit support 26 then translates along the branches 16 and 17 thanks to its two rails 29 and the pads 19a and 19b for guiding the stationary frame 13 in translation. In doing so, the connecting flange 30 of the bit support 26 is also displaced along an axis parallel with the axes of the branches 16 and 17, driving in its movement the second flat belt 14 placed on the two pulleys 21a and 21b. The second flat belt 14 then drives in its movement the connecting flange 25 of the counterweight 5 which, "biting" the strand of the second flat belt 14 left free by the connecting flange 30, also translates thanks to the rails 24a and 24b and the pads 18a, 18b, 18c for guiding in translation along an axis parallel with the axes of the branches 16 and 17; but the connecting flange 25 is displaced in the opposite direction to the displacement direction of the connecting flange 30 of the bit support 26. Thus, the bit support 26 and the counterweight 5 both translate in a synchronized manner, along parallel axes, and in opposite directions. It is in this manner that the counterweight 5 allows obtaining inertial dynamic balancing. The bits 8 and sensors 7, being part of the bit support 26, are displaced in the same manner as the latter.

Figure 8:
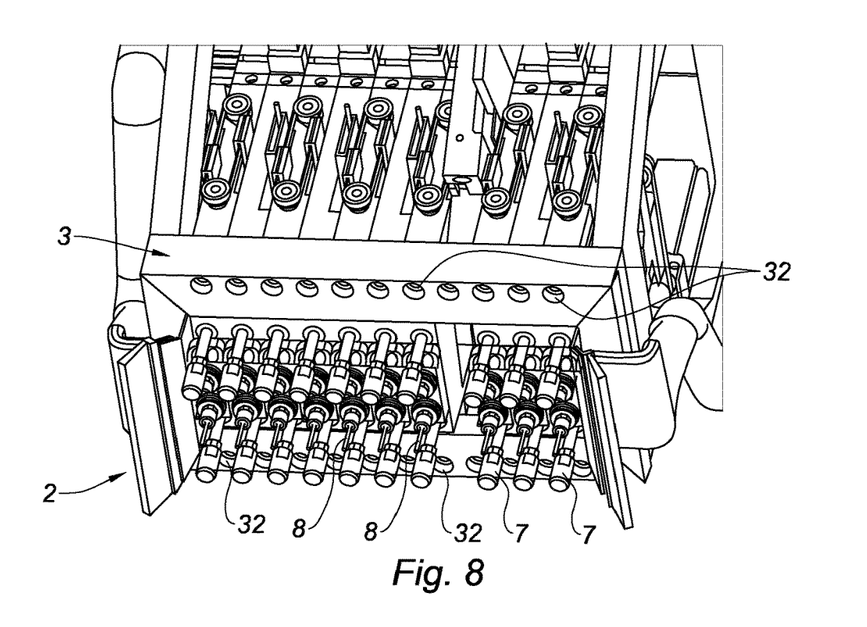
FIG. 8 is a local perspective view of the drilling head according to one form of the present disclosure.

In reference to FIG. 8, fixing the cassettes 4 on the support unit 3 is described.

The cassettes 4 are fixed on the support unit 3 thanks to the tapped holes 20 and suitable screws (not represented). The cassettes 4 are positioned with respect to the support unit 3 in such a manner that the tapped holes 20 are all facing a plain hole 32 the diameter of which is greater than the nominal diameter of the screws intended to be screwed into the tapped holes 20, but lower than the head of said screws. The mounting and dismantling of a cassette 4 fixed on the support unit 3 is hence done easily and avoids a maintenance team from having to intervene when a cassette 4 is defective and needs be replaced.

The assembly comprising the support unit 3 and the cassettes 4 forms the drilling head 2 (FIG. 1). The drilling head 2 is moved by the arm of a manipulator-type robot or a 5-axis machine (not represented) programmed for displacing the drilling head 2 on the successive areas of a component to be drilled (not represented).

When the surface of the component to be drilled does not have a uniform profile, the bit support 26 of each cassette 4 is displaced in such a manner that all the bits 8 of all the cassettes 4 are at the same distance from the area of the facing component. This operation is made possible thanks to the sensors 7 of the cassettes 4 which allow, in cooperation with the electric detector 28, to detect the surface of the component to be drilled and adjust the height of the bit support 26 accordingly.

The drilling operation begins when all the sensors 7 of the cassettes 4 are in contact with the surface of the component to be drilled and when the heights of the bit supports 26 with respect to the surface of the component to be drilled are substantially identical.

Advantageously, the drilling device 1 such as described above may be complemented by an associated program and apparatus allowing to save the various configurations of the bit supports 26 with respect to each other for each area of the component to be drilled above which the drilling head 2 is positioned. Thus, the drilling head 2 is configured more rapidly while passing from one area to be drilled to another if it must drill a component which it has already drilled once, since it can adjust the positioning of the bit supports 26 of the cassettes 4 with respect to each other during the displacement from one area to be drilled to another.

It goes without saying that the present disclosure is not limited to the forms described above by way of example, but it comprises all the technical equivalents and all the variants of the means described as well as their possible combinations.

What is claimed is:

1. A device for drilling an acoustic component comprising a drilling head, the drilling head comprising a support unit comprising at least two autonomous drilling cassettes each comprising at least one drill bit, a stationary frame with respect to the support unit and a bit support moveable along a main axis (Δ) of said at least two autonomous drilling cassettes between a retracted position and a deployed position, wherein each bit support is equipped with at least one device configured to sense a skin of the acoustic component to be drilled, allowing a position of the bit support to be adjusted relative to the skin of the acoustic component to be drilled before drilling of the skin begins to allow for automatic control of a drilling depth of said at least one drill bit of each autonomous drilling cassette.

2. The device according to claim 1, wherein each autonomous drilling cassette comprises a means for moving the bit support thereof in translation by means of a mechanism mounted on the stationary frame thereof and on the bit support.

3. The device according to claim 2, wherein the means for moving in translation is a ball screw, the ball screw being mounted on the stationary frame of the autonomous drilling cassette.

4. The device according to claim 2, wherein the means for moving in translation allows adjusting in an intermediate position the bit support between the retracted position and the deployed position.

5. The device according to claim 1, wherein each autonomous drilling cassette is removably fixed on the support unit.

6. The device according to claim 5, wherein the autonomous drilling cassettes are fixed on the support unit by means of screws or by clipping.

7. The device according to claim 1, wherein each autonomous drilling cassette includes two bits.

8. The device according to claim 1, wherein the autonomous drilling cassettes are disposed in line in a substantially adjoining manner on the support unit.

9. The device according to claim 8, wherein the device comprises eleven autonomous drilling cassettes disposed in a line, each comprising two bits disposed on either side of an axis of the line thus formed.

10. The device according to claim 1, wherein each autonomous drilling cassette comprises an inertial dynamic balancing means.

11. The device according to claim 1, wherein each autonomous drilling cassette is equipped with a brushless motor.

12. An acoustic drilling method implementing the device for drilling acoustic components according to claim 1.

13. A method for producing an acoustic component comprising an acoustic skin and a honeycomb structure, the method comprising the following steps:
    drape forming the acoustic skin with a carbon layer in the form of fabric;
    drape forming a double-sided adhesive layer made of polymer for allowing a subsequent adhesion of the acoustic skin on a honeycomb structure;
    adding the honeycomb structure on the acoustic skin;
    single curing, in order to polymerize the carbon layer and the double-sided adhesive layer of the acoustic skin, and finishing the assembling of the acoustic skin on the honeycomb structure; and
    drilling the acoustic skin with the acoustic drilling device according to claim 1, thus allowing to control a diameter of acoustic holes thus drilled and thereby the acoustic performance of the final acoustic component.

14. The device according to claim 1, wherein the positions of the bit supports of the at least two autonomous drilling cassettes are adjusted such that heights of the bit supports relative to the skin of the acoustic component to be drilled are substantially identical before the drilling of the skin begins.

15. The device according to claim 14, wherein the skin of the acoustic component is non-planar.

16. The device according to claim 1, wherein the positions of the bit supports of the at least two autonomous drilling cassettes are adjusted independently.

17. A cassette cooperating with a device for drilling an acoustic component, the device comprising a drilling head, the drilling head comprising a support unit,
    the cassette comprising:
    a stationary frame with respect to the support unit of the device;
    a brushless motor;
    a bit support moveable along a main axis (Δ) of the cassette between a retracted position and a deployed position;
    means for moving the bit support in translation;
    an inertial dynamic balancing mechanism;
    at least one bit; and
    a sensing device mounted to the bit support for sensing a skin of the acoustic component to be drilled, allowing a position of the bit support to be adjusted relative to the acoustic component before drilling of the acoustic component begins to allow for automatic control of a drilling depth of the at least one bit.

* * * * *